P. DRAGAN, C. DE GEORGE & R. PALMERO.
FEED AND WATER RESERVOIR.
APPLICATION FILED MAY 28, 1912.
1,113,887.
Patented Oct. 13, 1914.
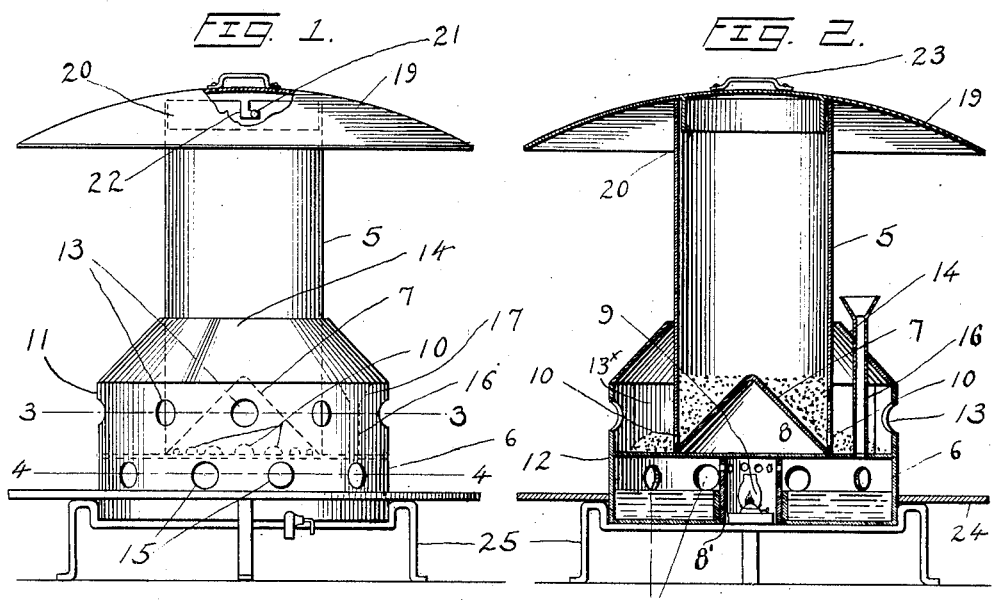
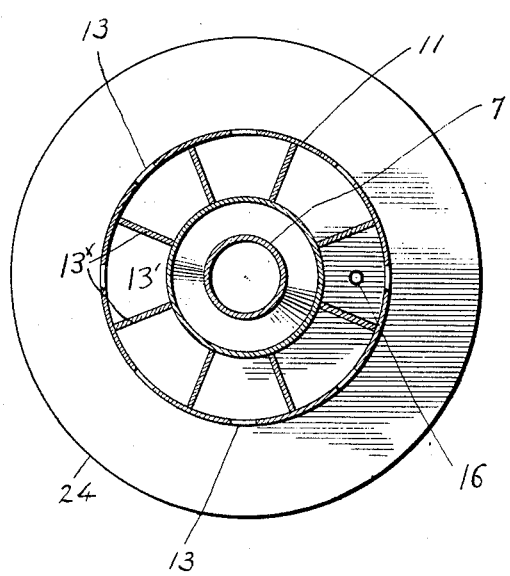
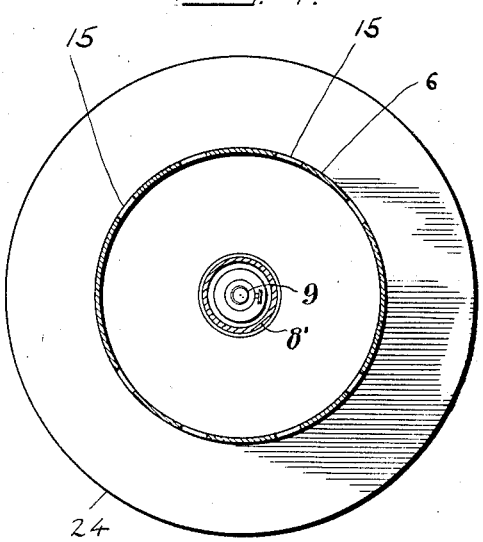
Witnesses
P. M. Hunt
F. O. Parker
Inventors
Philip Dragan
Charles DeGeorge
Raymond Palmero
By Victor J. Evans
Attorney

UNITED STATES PATENT OFFICE.

PHILIP DRAGAN, CHARLES DE GEORGE, AND RAYMOND PALMERO, OF PHILADELPHIA, PENNSYLVANIA.

FEED AND WATER RESERVOIR.

1,113,887.     Specification of Letters Patent.     Patented Oct. 13, 1914.

Application filed May 28, 1912. Serial No. 700,357.

*To all whom it may concern:*

Be it known that we, PHILIP DRAGAN, CHARLES DE GEORGE, and RAYMOND PALMERO, citizens of the United States, residing at Philadelphia, in the county of Philadelphia and State of Pennsylvania, have invented new and useful Improvements in Feed and Water Reservoirs, of which the following is a specification.

The invention relates to a feed container, and more particularly to the class of combination feed and water reservoir or trough.

The primary object of the invention is the provision of a device of this character in which feed and water will be held so as to be accessible to poultry and which will automatically empty on the consumption of the feed and water by the poultry.

Another object of the invention is the provision of a device of this character wherein the feed and water will be protected so as to render the same sanitary and which will allow any number of fowls to eat and drink therefrom.

A further object of the invention is the provision of a device of this character in which the feed and water contained therein can be heated to maintain a uniform temperature and prevent the food from becoming damp or wet and the independent compartments thereof for receiving the feed and water can be readily filled when the occasion requires.

A still further object of the invention is the provision of a device of this character which is simple in construction, strong, durable, thoroughly reliable and efficient in its operation, and inexpensive in manufacture.

With these and other objects in view the invention consists in the construction, combination and arrangement of parts as will be hereinafter more fully described, illustrated in the accompanying drawing, and pointed out in the claim hereunto appended.

In the drawing:—Figure 1 is a side elevation of the device constructed in accordance with the invention. Fig. 2 is a vertical longitudinal sectional view thereof. Fig. 3 is a sectional view on the line 3—3 of Fig. 1. Fig. 4 is a sectional view on the line 4—4 of Fig. 1.

Similar reference characters indicate corresponding parts throughout the several views in the drawing.

Referring to the drawings by numerals, the device comprises a cylindrical body 5 superimposed upon and rising centrally from the top of a circular-shaped water tank 6, the lower end of the body 5 being closed by means of a conical shaped bottom 7 forming a dead air chamber 8, the same rising from the top of the water tank 6 centrally thereof which has detachably held therein a central column 8' in which is detachably fitted a suitable heating lamp 9, and when lighted the said lamp will distribute heat to the interior of the said body 5, whereby its contents may be heated. Adapted to be placed within the body 5 is a predetermined quantity of food for consumption by poultry, the feed being discharged through a series of discharge ports 10 formed in the side wall of the body 5 at the lower end thereof so that the feed will flow into a circular-shaped trough 11 concentric with respect to the body 5 and formed by the vertical wall 12 rising from the marginal edge of the water tank 6, the said wall 12 being provided with feeding openings or holes 13 so that the fowls can gain access to the feed contained in the trough 11 through the openings or holes in the said walls. The trough 11 is divided into independent cells or spaces 13', by means of partitions 13$^\times$, so as to accommodate varying qualities of food, as will be apparent. It will be apparent that the dead air chamber 8 prevents the scorching or burning of the contents of the body 5 when the heating lamp 9 is lighted. Closing the upper end of the trough 11 is a frusto-conical-shaped lid or cover 14 which surrounds the body 5 and can be readily and easily raised or lowered for the opening or closing of the trough.

The side wall of the water tank 6 is provided with a series of drinking openings or holes 15 through which the fowls can gain access to the water contained within the said trough. Rising from the top of the water tank 6 at one side of the body 5 is an inlet tube 16 formed with a filling funnel 17 at its upper end whereby water can be supplied to the tank when desired, it being understood of course that the cover or lid 14 closing the trough 11 will be raised when it is desired to fill the water tank 6 through the filling funnel as will be apparent. Mounted in the side wall of the water tank 6 at any desirable point thereof is a drain faucet of the ordinary structure whereby the contents of the said tank can be discharged therefrom when required.

Detachably connected to the upper open end of the body 5 is an umbrella-shaped cover 19 which is of a size to overhang the trough 11 and project a considerable distance beyond the same to shed water, snow or the like thus preventing the wetting of the feed within the trough the cover 19 being formed with a central depending circular-shaped flange 20 adapted to telescope within the upper open end of the body 5, and carries at one side an outwardly projecting locking lug 21, which is adapted to engage in a bayonet slot 22 formed in the side wall of the body 5 and in this manner locking the removable cover 19 thereon. Formed on and projecting upwardly from the outer face of the removable cover 19 is a loop handle 23 whereby said cover can be turned and lifted from the said body 5 or placed thereon in a convenient manner.

The water tank 6 is removably supported at an elevation from the foundation of the ground on a supporting frame or platform 24, the same being formed with legs or props 25 which engage and rest upon the foundation or ground. However, the device may be placed so as to rest upon the foundation or ground and in this instance the supporting platform or frame is dispensed with.

From the foregoing, taken in connection with the accompanying drawing, it is thought that the construction and operation of the invention will be clearly understood, and therefore, a more extensive explanation has been omitted.

What is claimed is:—

A device of the class described comprising a body having an imperforate horizontal partition forming superposed chambers and also having side perforations to permit access to both of said chambers, said body being formed with a central opening in its bottom, a circular flange rising from the bottom concentric to the opening, a tube removably telescoped in the circular flange and abutting against said partition and having apertures contiguous to the latter, a heater in the tube, and a feed hopper rising from the partition and having a cone-shaped bottom to form a dead air space directly above the tube containing the heater.

In testimony whereof we affix our signatures in presence of two witnesses.

PHILIP DRAGAN.
CHARLES DE GEORGE.
RAYMOND ✕ PALMERO.
his mark

Witnesses:
HELEN G. DALEY,
NORMAN J. SMITH.